United States Patent
Wrighton et al.

(10) Patent No.: US 8,434,068 B2
(45) Date of Patent: Apr. 30, 2013

(54) DEVELOPMENT SYSTEM

(75) Inventors: Michael Thomas Wrighton, Bristol (GB); Matthew David Fyles, Wiltshire (GB); Hendrik Lambertus Muller, Bristol (GB)

(73) Assignee: XMOS Ltd., London (GB)

( * ) Notice: Subject to any disclaimer, the term of this patent is extended or adjusted under 35 U.S.C. 154(b) by 1224 days.

(21) Appl. No.: 12/256,938

(22) Filed: Oct. 23, 2008

(65) Prior Publication Data

US 2010/0107146 A1    Apr. 29, 2010

(51) Int. Cl.
*G06F 9/44* (2006.01)

(52) U.S. Cl.
USPC .......................... 717/131; 717/124; 717/142

(58) Field of Classification Search .................... None
See application file for complete search history.

(56) References Cited

U.S. PATENT DOCUMENTS

| | | | |
|---|---|---|---|
| 6,543,048 B1 * | 4/2003 | Kuzemchak et al. ......... | 717/127 |
| 7,970,596 B2 * | 6/2011 | Bade et al. ...................... | 703/13 |
| 2007/0028227 A1 | 2/2007 | Lebowitz | |
| 2009/0132998 A1 * | 5/2009 | Meijer et al. .................. | 717/124 |

OTHER PUBLICATIONS

International Search Report corresponding to International Patent Application No. PCT/EP2009/063559, dated Jan. 18, 2010.
Yoshimasa Niwa, et al., Talktic: A Development Environment for Pervasive Computing Applications, vol. 352, Dec. 2008, pp. 34-41, XP040461275.
Stefanos Gritzalis, et al., Security Issues Surrounding Programming Languages for Mobile Code: Java vs. Safe-Tcl, pp. 16-32, XP40132994.
Application Design Challenges, Passage, Jan. 1, 1996, chapter 18, pp. 395-405, XP002916599.
John A. Miller, et al., The JSIM Web-Based Simulation Environment, vol. 17, No. 2, Oct. 1, 2000, pp. 119-133, XP004217592.
Sun Microsystems, et al., Release Notes Java Workshop, Release: Dev 2—Nov. 1995, retrieved from URL:http://asterix.astro.uni.torun.pl/vari, XP002096889.
Jim Whitehead, Collaboration in Software Engineering: A Roadmap, XP40062029.
A. Baccigalupi, et al., Overview on Development of Remote Teaching Laboratories: From LabVIEW to Web Services, pp. 992-997, XP31056854.
Andrey Sukhanov, et al., Online Monitoring and Remote FPGA Configuration Using JTAG Over Ethernet, pp. 1-2, XP31160948.

* cited by examiner

*Primary Examiner* — Chuck Kendall
(74) *Attorney, Agent, or Firm* — Sughrue Mion, PLLC

(57) ABSTRACT

A system comprising: a server; a computer terminal coupled remotely to the server via a network and installed with a web browser; and an external test platform, connected externally to the computer terminal, the test platform comprising a programmable target device and interface circuitry operable to communicate between the computer terminal and the target device. The server hosts a development tool available for download to the web browser via the network. The development tool comprises: one or more applets to be run by the web browser, and one or more web pages for display by the web browser to provide a user-interface for the development tool including to provide access to the one or more applets. The one or more applets at least comprise code-analysis applet software programmed so as when run by the web browser to operate said interface circuitry to: load code to be tested from the computer terminal onto the target device for test operation.

40 Claims, 3 Drawing Sheets

DEVELOPMENT SYSTEM

FIELD OF THE INVENTION

The present invention relates to a development tool for developing code, and particularly a development tool at least for testing the code on a sample of the target processor or other programmable target device.

BACKGROUND

When developing program code, a developer will often make use of an integrated development environment (IDE). An IDE is a development tool in the form of a computer application that combines together multiple facilities for use by a developer in creating and developing their program code, preferably combined together into a single application or package. For example, the IDE would typically provide a source code editor which the developer can use to type in and edit the high-level source code from which the program is to be compiled. The IDE would also typically provide a compiler for compiling the source code to assembly code or machine code, an assembler for assembling assembly code into machine code, and a linker for linking together the machine code of different object files. The IDE may also include facilities allowing the developer to investigate the logical or hierarchical structure of different components within the program, such as the relationship between different objects and/or classes in program created using an object-oriented language.

Furthermore, an IDE will often include some kind of code analysis software for performing a test run of the code. In many cases, the code being developed may be intended for (and indeed only be suitable for) execution on a processor other than that of the computer terminal on which the IDE application is run. The intended processor is referred to as the target processor or target device. In such a case, a sample of the target processor may be connected externally to the developer's terminal via a peripheral interface. The analysis software will then include a loader which uses the peripheral interface to load the developed code (in its executable machine-code form) into a memory of the target processor and control the target to execute that code for the purpose of testing.

In addition, the analysis software will further include some software for analysing the actual runtime behavior of the executed code, using observations made via the peripheral interface as the code is executed. This may be referred to as dynamic analysis (as opposed to static analysis which is done without any actual execution of the code). To facilitate the dynamic analysis, either the code to be tested is instrumented with test-related instructions which output trace information relating to the executed code's behavior on the target, or otherwise the analysis software requests trace information to be received from the target processor, for example using some form of interrupts.

One type of analysis software is a debugger for identifying errors in the code. In that case, the trace information includes information regarding exceptions or error traps occurring during the test execution, and the debugger collects this information and reports on the associated errors. The debugger may also provide facilities to aid the developer in assessing the errors such as by locating their source.

Another type of analysis software is a profiler. In that case, the trace information includes reports on events occurring during the normal execution of the code, such as the number, frequency and/or duration of certain function calls or system calls or accesses to certain addressed locations. The results provided by the profiler then help the developer to optimise the code with regard to one or more finite resources of the target, such as processing usage or memory usage.

SUMMARY

However, despite the advantages of IDEs and other development tools having testing capabilities, the inventors have recognised that the usefulness of these tools is restricted by the fast-moving pace of change in the industry. Particularly, the functionality of the development tool is closely married to the target processor, but important advancements by the tool's authors relating to preferred methods of debugging or profiling the target processor may be ongoing even after the tool has been provided to customers.

According to one aspect of the invention, there is provided a system comprising: a server; a computer terminal, coupled remotely to the server via a network, and installed with a web browser for displaying web pages and communicating with said server via the network; an external test platform, connected externally to said computer terminal, the test platform comprising a programmable target device and interface circuitry operable to communicate between the computer terminal and the target device; wherein the server hosts a development tool available for download to the web browser via said network, the development tool comprising: one or more applets to be run by the web browser, and one or more web pages for display by the web browser to provide a user-interface for the development tool including to provide access to said one or more applets; and wherein the one or more applets at least comprise code-analysis applet software programmed so as when run by the web browser to operate said interface circuitry to: load code to be tested from the computer terminal onto the target device for test operation.

By providing, from a remote server via the computer terminal's web browser, a web-hosted development tool in the form of an applet which can interact with the test platform, the present invention thus allows the tool to be readily updated by its authors whilst at the same time always presenting the tool to the user (i.e. the code developer) in its most up-to-date form. Rather than the tool being distributed infrequently on discrete occasions as with previous tools, the user can simply access the tool as a web page each time he or she wishes to work on his or her code, and each time can be assured that the tool is the most up-to-date available without needing to be concerned or even aware of it being updated.

In a preferred embodiment, at least the one or more applets comprising the code-analysis applet software as hosted by said server are digitally signed by a private key of a distributor of those one or more applets; and the web browser is configured to authenticate said one or more applets using a public key distributed by said distributor and corresponding to said private key, and to only allow the code-analysis applet software access to the test platform on condition of said authorisation.

One difficulty with implementing a web-hosted development tool with the facility of testing an external target device is that the applet needs access to the external test platform, but the security procedures of the browser may prevent this. However, by making the access to the test platform conditional on authorisation of a digital signature in the applet, this preferred embodiment of the present invention can ensure that the tool is trusted and so allowed by the browser both to output code to the external test platform and to control the external test platform.

According to another aspect of the present invention, there is provided a method of testing code using an external test platform connected to a computer terminal, the test platform comprising interface circuitry and a programmable target device, and the method comprising: downloading a development tool from a server via a network to a web browser installed on the computer terminal, the development tool comprising: one or more web pages, and one or more applets at least comprising code-analysis applet software for testing code on said programmable target device; providing a user-interface for the development tool by using the web browser to display said one or more web-pages; accessing the one or more applets via said one or more web pages as displayed by the browser; and using the web browser to run the code-analysis applet software and thus operate the interface circuitry of said external test platform to load code to be tested from the computer terminal onto said target device for test operation.

According to further aspects of the present invention, there is provided a development tool product, embodied on a computer-readable medium, for hosting on a server.

According to another aspect of the present invention, there is provided a server hosting a development tool.

BRIEF DESCRIPTION OF THE DRAWINGS

For a better understanding of the present invention and to show how it may be carried into effect, reference will now be made by way of example to the following drawings in which.

DETAILED DESCRIPTION OF PREFERRED EMBODIMENTS

In a preferred embodiment, the present invention provides a system that allows an integrated development environment (IDE) running inside a web browser to interact with a development kit that is connected to the terminal on which the web browser runs.

Figure 1:
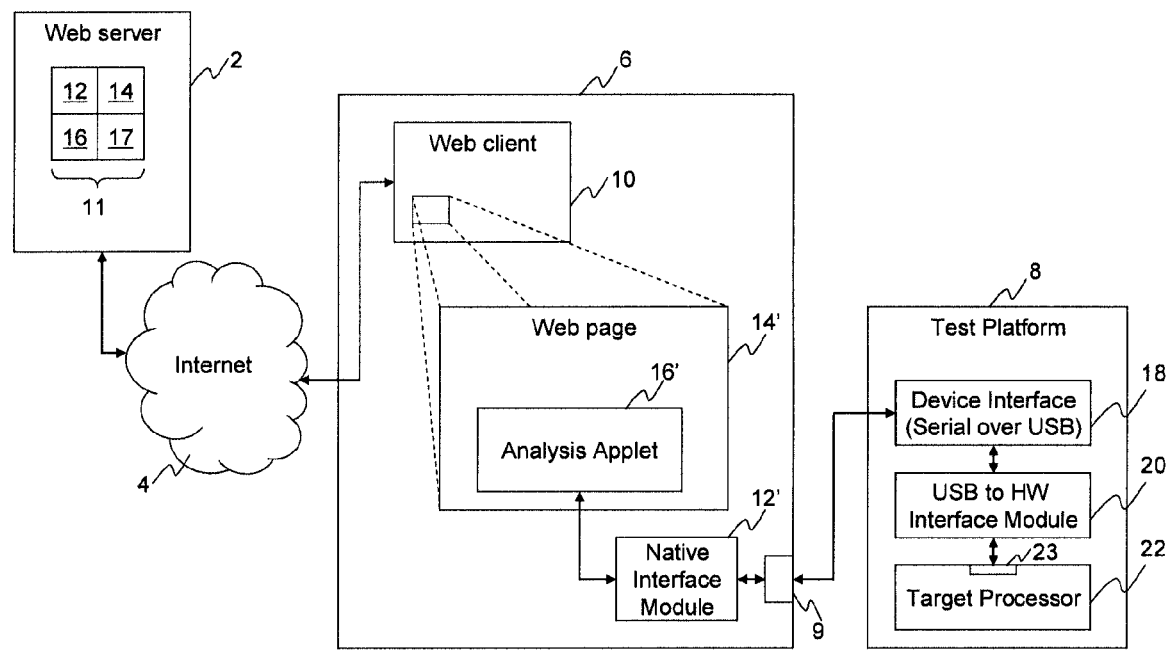
FIG. 1 is a schematic block diagram of a development system.

FIG. 1 is a schematic block diagram of a development system according to a preferred embodiment of the invention. The system comprises a web server 2 connected to the Internet 4, and a computer terminal 6 such as a desktop or laptop PC which is also connected to the Internet 4. The computer terminal 6 is installed with a web client (i.e. browser) 10. The web browser 10 is configured so as when run to be able to communicate with the web server 2 via the internet 4. The web server 2 hosts (i.e. stores in manner accessible via the Internet 4) an IDE 11 comprising a native interface module 12, at least one web page 14, a code analysis applet 16, and potentially one or more other applets 17. Either by means of functions in the web page 14 and/or by means of the one or more applets 17, the IDE 11 may include for example a source code editor, a compiler, an assembler, a linker and/or a simulator. The operation of these components of the IDE will be described in more detail below.

The system further comprises a hardware test platform 8 which is connectable to the computer terminal 6 via an appropriate peripheral port 9 in the terminal 6 such as a USB port. The test platform 8 is a peripheral unit, external to the computer terminal 6, on which a sample of the target processor 22 is mounted. Note that the term "processor" is not necessarily used herein to refer to a device having a single execution unit, but can also refer to a multi-core processor comprising a plurality of interconnected execution units, either on the same chip or different chips. In one embodiment for example, the target processor 22 may be a four-core XS1-G4 available from XMOS Ltd. The processor 22 may also be a multi-threaded processor, whereby a plurality of program threads are executed in a concurrent manner by being interleaved through a given execution unit. The present invention has a particularly (but not exclusively) advantageous application to the testing of code developed for multi-core processors and/or multi-threaded processors, since this is an area the inventors have identified in which ongoing advancements in testing techniques has made conventional distribution of development tools particularly inadequate.

In addition to the target processor 22, the test platform 8 comprises a first interface circuitry module 18 for connecting to the port 9 of the computer terminal 6. The first interface module 18 is configured to communicate according to a first protocol which is appropriate to the computer terminal 6. This is preferably a USB interface, the port 9 being a USB port. The test platform 8 further comprises a second interface circuitry module 20 connected between the first interface module and a test interface 23 of the target processor 22. The second interface module 20 is configured to convert between the first protocol and a second protocol appropriate to the test interface 23. Preferably the test interface 23 is a JTAG (Joint Test Action Group) interface, and preferably the second module is configured to convert between USB and JTAG. Thus, by means of the first and second interface modules 18 and 20, the port 9 and the test interface 23, the system is configured to communicate test-related data from the computer terminal 6 to the target processor 22 and vice versa.

In operation, the web server hosts the web pages 14 and applets 16 and 17 that constitute the integrated development environment (IDE) 11, such that they are made available for download from the web server 2 to the computer terminal 6 via the Internet 4. The web server may also host the native interface module 12 as part of the IDE 11, so that is available for download too.

The user of the computer terminal 6 (i.e. the code developer) opens their web browser 10 which is executed on a processor of the terminal 6 (not the target processor 22) and displayed on a screen of that terminal. Using the browser 10, the user enters the web address of the IDE 11 causing the browser 10 to download a copy of the webpage 14' from the server 2. The user may also navigate to other pages 14' of the IDE 11 which are similarly downloaded. The downloaded web page or pages 14' are HTML files (or other hypertext or hypermedia documents) which contain tags to the IDE's applets 16 and 17. When the browser 10 encounters these tags, it downloads a copy of the appropriate applet 16' or 17' and displays them to the user as part of the corresponding webpage 14'.

By implementing the IDE 11 as one or more web pages 14' and applets 16' and 17', the tool is thus presented to the user as a convenient, readily-accessible graphical user-interface.

Note that "applet" refers to a program that can be download from the Internet and specifically which is run by a browser 10. The applet appears to the user to be part of that webpage. This is distinct from an application, which is run outside of any browser as a stand-alone program in its own right.

For example, the Java language is a commonly used for applets and is recognised by all major browsers.

Figure 2:
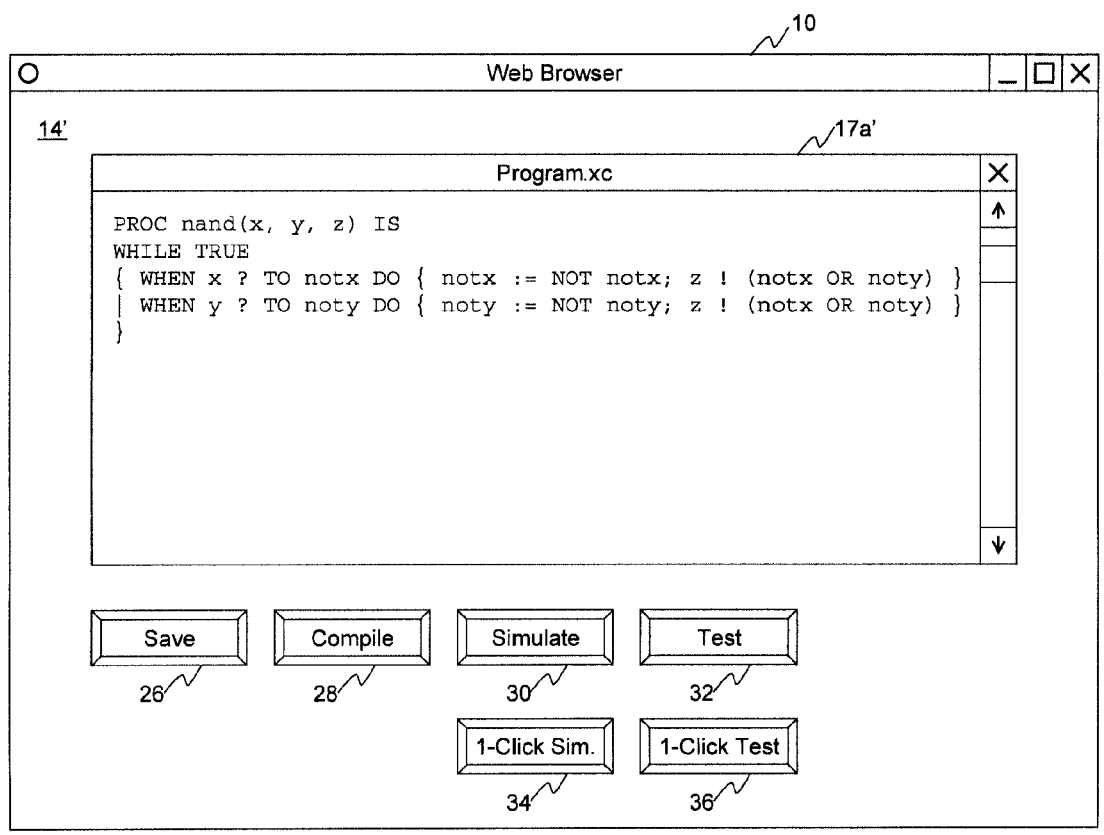
FIG. 2 is a simplified schematic view of an IDE user interface.

A simplified, schematised user-interface presented by an IDE webpage 14' is illustrated in FIG. 2 (with the reference numerals here indicating the components as viewed by the user, as opposed to referring to the corresponding components of stored code as in FIG. 1). As shown, the webpage 14' preferably tags to a source code editor applet 17a' which allows the user to type a program into a web page 14' in high-level source code such as C or C++.

The webpage 14' further comprises a save control 26, build control 28, simulate control 30 and test control 32. In response to the user activating the save control 26, the webpage 14' invokes a save function to be run on the browser 10 which saves the code (since the user may require several sessions to fully write the code). This may be saved either on a local storage medium of the computer terminal 6 or uploaded via the Internet 4 to be saved on the web server 2. In response to the build control 28, the webpage 14' invokes a build function to upload the high-level code via the Internet 4 to the web server 2 where it is compiled, assembled and/or linked there as appropriate in order to convert the high-level code into executable machine-code suitable for execution on the target processor 22, then sent back to the terminal 6. Alternatively, the webpage 14' could invoke compiler, assembler and linker applets to be run on the browser 10 as appropriate in order to convert to machine code. In response to the simulate control 30, the webpage 14' invokes a simulation function to upload the machine code via the Internet 4 to the web server 2 where the running of that machine-code is simulated, and then the results returned back to the terminal 6. Alternatively, the webpage 14' could invoke a simulator applet to be run on the browser 10 to simulate the running of the machine-code.

Alternatively or additionally, the webpage 14' could comprise a single-click simulate control 34 which saves, builds and simulates the code all in response to a single mouse click; and/or a single click test control 36 which saves, builds and tests the code all in response to a single mouse click.

However, the simulation may not capture all aspects of the code as if it were executed on the target processor 22. Therefore it is also desirable to test the code by actually executing it on the target processor 22. Therefore in response to activation of the test control 32 by the user, the webpage 14' invokes code analysis applet 16' to be run on the browser 10. The analysis applet 16' comprises a loader which downloads the machine code to the a memory of the target processor 22 for a test run, via the native interface module 12, USB port 9, the first and second interface modules of the test platform 8 and the JTAG interface 23 of the target processor 22 (e.g. the Java Native Interface is used to perform communications which cannot be implemented entirely in the Java programming language, e.g. when the standard Java class library does not support some platform-specific features). The loader also sends a control signal to the target processor 22 via this route to control it to begin execution of the code to be tested. The analysis applet 16' also comprises a debugger and a profiler. When the code is executed on the target 22, it returns trace information to the analysis applet 16' for use by the debugger and profiler, either under the execution of instrumented instructions in the code or interrupts from the debugger or profiler.

However, as mentioned, in most browsers 10 there are security issues with allowing an applet to access an external device. Since applets are downloaded from the Internet, by default the browser 10 will require them to run in a secured environment to ensure they don't perform any destructive operations on the user's computer.

All browsers provide a mechanism to execute code on the client that performs interaction with the user, but browsers also have an option to execute "trusted" code that allows intimate interaction with the browser's hardware. This "trusted" code execution is provided by a plug-in mechanism which all modern browsers support allowing third party code execution within the browser itself.

A trusted applet is made as such by being signed with digital signature added to that applet by a distributor (e.g. an author or publisher), to prove that it came from a particular trusted source and has not been tampered with. The browser 10 is configured to require signature to be authorised before an applet can be granted access to any external peripheral device, including the test platform 8.

As will be familiar to a person skilled in the art, the signing and authorisation works by a process of public key cryptography. According to such a process, the distributor generates a public and private key pair (from a large random number), then signs the applet with the private key and distributes the applet to users along with the public key. A user's browser 10 can authenticate that the applet originated from the distributor in question by applying the public key which, by a suitable algorithm, can determine whether the applet was signed with the correct private key (although without actually revealing the private key to the user).

The analysis applet 16' preferably uses this type of secure browser interface to find any attached target hardware, and establishes a communication path to this hardware. In our case, JTAG over serial USB interfaces are used. That is, the JTAG interface 23 is connected to the computer terminal's USB bus via the USB port 9, and the analysis applet 16' communicates over the USB bus and queries the JTAG chip. The JTAG interface in turn queries the JTAG scan chain and detects hardware that is detected, and on which programs can be downloaded.

The JTAG interface is an industry standard mechanism for allowing external access to an electronics device. It provides an interface to allow software development tools to control the attached hardware. This functionality is used to allow tools such as debuggers and profilers to access the device and provides the capability to do interactive software development with a piece of test hardware. In the preferred embodiments of the invention, this interface has been made available through an applet 16' which can be run inside a web browser 10. This allows development tools to be provided within a web browser context whilst losing none of the capability that would be normally be associated with a non web based application. The applet 16' presents attached hardware to the user and allows the user to download and execute code on the attached hardware. The user can also debug programs running on this hardware from the web environment, as if they were using native tools.

As mentioned, in one embodiment, the applet 16' may provide a single-click test-run control, where from the web environment the user can save, compile and execute a program on target hardware in a single click of the mouse.

Preferably, the target processor 22 is arranged to execute asynchronously from the web applet 16', allowing the web applet 16' to perform other tasks, e.g. monitoring other cores or performing an interaction with the user.

Figure 3:
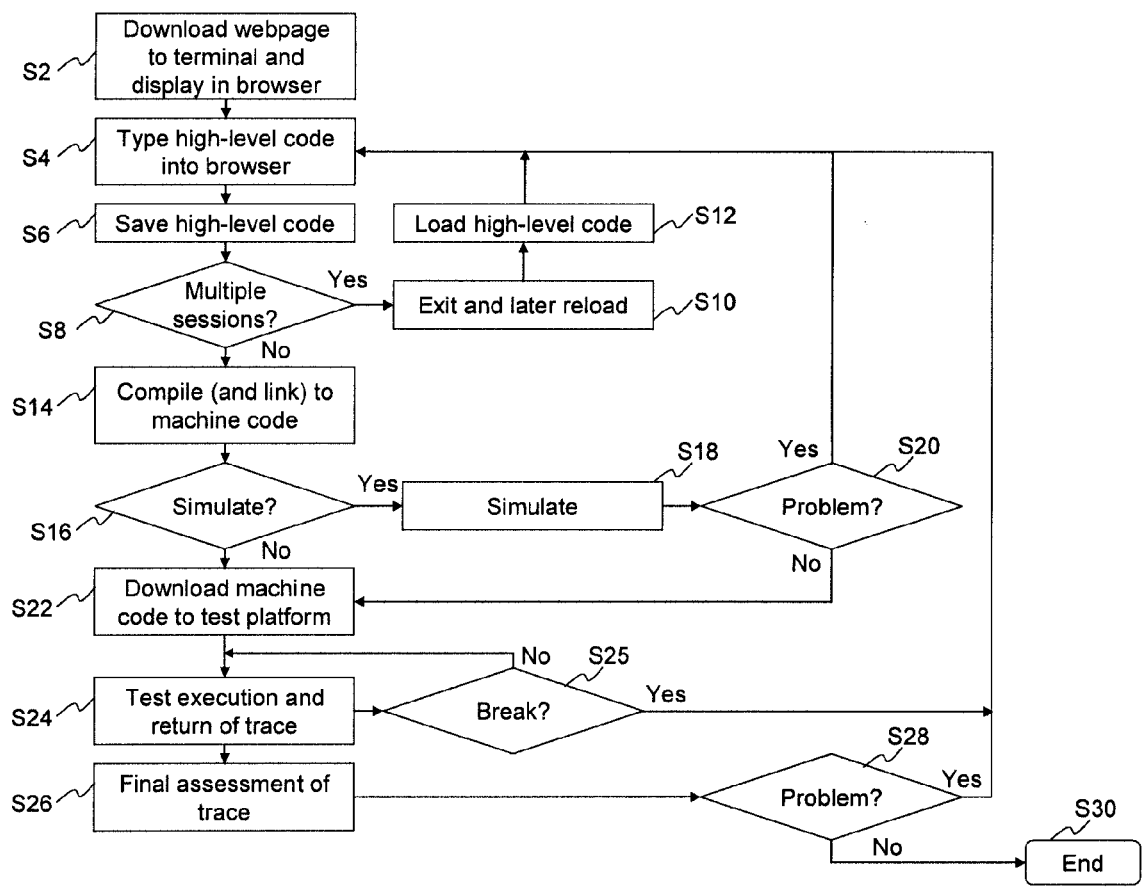
FIG. 3 is a flow chart of a testing process.

A method according to a preferred embodiment of the present invention is now discussed in relation to the flow chart of FIG. 3.

At step S2 the user enters the web address of the IDE development tool 11 into their web browser 10. This causes the browser 10 to download and display a copy of the webpage 14', and to download and run a copy of the source code editor applet 17a'. The tool is thus displayed graphically to the user in an easily accessible manner. At step S4, the user types in high-level source code into a window displayed by the source code editor applet 17a'. At step S6 the user activates a control causing the browser 10 to invoke the save function which saves the user's high-level code, either locally on the terminal 6 or by uploading it remotely to the server 2. At step S8, the user decides whether they need to return to writing the code at a later session before compiling. If so, at step S10 the user exits the IDE tool 11 then returns to reload the webpage 14' at a later time or date, and at step S12 activates a control causing the browser 10 to invoke a load function to load the previously saved code. Steps S4 to S12 are then repeated as necessary.

Once the high-level code is ready, the method proceeds to step S14 where the user activates a build control causing the browser 10 to invoke compiler, assembler and linker functions (as necessary) which upload the high-level source code to the server 2 where it is converted into executable machine code suitable for execution on the target processor 22 and then the machine code is returned to the terminal 6. Alternatively, the build control could cause the browser 10 to run compiler, assembler and linker applets to convert to executable machine code on the user's computer terminal 6 itself.

At step S16 the user decides whether to simulate the machine-code first before testing it on the actual physical sample of the target processor 22. If so, at step S18 the user activates a control causing the browser 10 to invoke a simulate function which uploads the machine code to the server 2 which simulates the running of the machine-code virtually (i.e. without actual execution). Alternatively the simulate control could cause the browser 10 to run a simulator applet to perform the simulation locally on the user's own terminal 10. Either way, the simulation may indicate various errors or performance results, in response to which at step S20 the user may decide whether to return to step S4 to modify the high-level code. If the simulation was satisfactory though, or if no simulation was performed, the method proceeds to step S22.

At step S22, the user activates a control causing the browser to download and run the analysis applet 16' (or it may have been downloaded previously). The analysis applet 16' then downloads the machine code from the computer terminal 6 to the target processor 22 on the test platform 8, via the native interface module 12, USB port 9, USB interface 18, USB-JTAG interface 20 and JTAG interface 23. The analysis applet 16' also sends a control signal to the target processor 22, via the same route, which triggers the target processor 22 to execute the machine-code for testing. At step S24, the target processor thus begins executing the machine-code to be tested and during that time returns any trace information regarding errors and/or performance to the test applet 16' running on the browser 10 on the computer terminal 6, via the JTAG interface 23, JTAG-USB interface 20, USB interface 18, USB port 9 and native interface module 12. The trace information may be generated by instrumented instructions in the test code or by interrupts signaled by the test applet 16' (again via the native interface module 12, USB port 9, USB interface 18, USB-JTAG interface 20 and JTAG interface 23).

The testing process may be interactive, e.g. so at any point throughout the test execution there may be break points detected at step S25 which is indicative of an error and causes the execution to halt, in which case the user returns to step S4 to modify the source code. This may preferably be done using utilities provided by the debugger. For example the debugger might identify the nature of an error and from where in the source code it originates If no breaks were generated, then at step S26, the user may perform a final assessment of the trace information collected by the debugger and/or profiler, preferably using utilities provided by the debugger and/or profiler. For example the debugger might identify non-fatal errors and from where in the source code they originate, or the profiler might process performance statistics into a form more manageable for the user.

At step S30, the user decides whether the test run was satisfactory. If not, the user returns to step S4 to modify the source code in light of the assessment. If so however, the user has created an end product ready for use and the method ends at step S30

It will be appreciated that the above embodiments are described only by way of example. For instance, although the above has been described in terms of individual applets 16 and 17, this is not intended to imply that an applet must only refer to any particular discrete unit of software. For the avoidance of doubt, the term "applet software" may be used herein to mean any software to be run in a browser, which covers either an applet, a plurality of applets, or a portion of an applet. Further, although the above has been described in terms of a server 2, it will be appreciated that the hosting of the tools or other functionality of the server 2 may be spread over multiple physically separate servers and that the term server in its most general use does not limit to a single physical unit. Further, although the above has been described in terms of preferred languages and protocols such as Java, USB and JTAG, it will be appreciated that others can be used. Other uses and configurations of the present invention may be apparent to a person skilled in the art given the disclosure herein. Further, although the above has been described in terms of testing machine code on a processor, the present invention could also be used to test code of other programmable target hardware devices. For example, in an alternative embodiment the target device could be a Field Programmable Gate Array (FPGA), in which case the code to be tested would be the configuration file loaded onto the FPGA in order to configure it to its desired functionality. Further, although the above has been described in terms of the Internet, it will be appreciated that web pages can be hosted over other networks and that web browsers can be used to access such web pages from other networks. Further, although the above has been described in terms of analysis software that loads the code, triggers its execution and receives back trace results, more generally the term "analysis software" or similar may refer to software for use as only part of the analysis process, so that the analysis applet software of the present invention may in the least only load the code for testing and leave the remaining triggering and/or observation for other methods. The scope of the invention is not limited by the described embodiments, but only by the following claims.

The invention claimed is:

1. A system comprising:
 a server;
 a computer terminal, coupled remotely to the server via a network, and installed with a web browser for displaying web pages and communicating with said server via the network;
 an external test platform, connected externally to said computer terminal, the test platform comprising a programmable target device and interface circuitry operable to communicate between the computer terminal and the target device;
 wherein the server hosts a development tool available for download to the web browser via said network, the development tool comprising: one or more applets to be run by the web browser, and one or more web pages for display by the web browser to provide a user-interface for the development tool including to provide access to said one or more applets; and wherein the one or more applets at least comprise code-analysis applet software programmed so as when run by the web browser to operate said interface circuitry to load code to be tested from the computer terminal onto the target device for test operation, and to operate said interface circuitry to control the target device to perform the test operation using said code.

2. The system of claim 1, wherein the code-analysis applet software is programmed so as when run by the web browser to operate said interface circuitry to return to the computer terminal trace information generated by the target device as a result of said test operation.

3. The system of claim 1, wherein the programmable target device comprises a target processor, and the code-analysis applet software is programmed so as when run by the browser to: load executable machine-code to be tested from the computer terminal onto the target processor for test execution, control the target processor to perform the test execution using said machine-code, and return to the computer terminal trace information generated by the target device as a result of said test execution.

4. The system of claim 1, wherein the programmable target device comprises a field programmable gate array, and the code-analysis applet software is programmed so as when run by the browser to: load configuration-code to be tested from the computer terminal onto the field programmable gate array for the test operation, control the field programmable gate array to perform the test operation using said configuration-code, and return to the computer terminal trace information generated by the field programmable gate array as a result of said test execution.

5. The system of claim 1, wherein said network is the Internet.

6. The system of claim 2, wherein the code-analysis applet software is programmed so as, when run by the web browser, to operate said interface circuitry to return the trace information to the code-analysis applet software for analysis thereby.

7. The system of claim 6, wherein the code-analysis applet software comprises a debugger programmed to facilitate the detection of errors in said code using said trace information.

8. The system of claim 6, wherein the code-analysis applet software comprises a profiler programmed to determine performance statistics using said trace information.

9. The system of claim 1, wherein at least the one or more applets comprising the code-analysis applet software as hosted by said server are digitally signed by a private key of a distributor of those one or more applets; and the web browser is configured to authenticate said one or more applets using a public key distributed by said distributor and corresponding to said private key, and to only allow the code-analysis applet software access to the test platform on condition of said authorization.

10. The system of claim 3, wherein the development tool comprises an integrated development environment, such that said one or more applets further comprise at least:
user-interface applet software programmed so as when run by said browser to present an user-interface of the development tool to the user and allow the user to enter high-level source code into the browser; and
compiler applet software programmed so as when run by said browser to compile said high-level code into said machine code to be tested.

11. The system of claim 3, wherein said one or more web-pages provide access to a function allowing a user to upload high-level source code to said server for compilation; and the server comprises a compiler programmed to, in response to said upload, compile said high-level code into said machine code and return the machine code to the terminal for testing by said code-analysis applet software.

12. The system of claim 1, wherein said interface circuitry comprises:
a first interface module connected to the computer terminal and configured to communicate with the first terminal according to a first protocol, and
a second interface module connected between the first interface module and the target processor, and configured to convert between the first protocol and a second protocol used to communicate with the target device.

13. The system of claim 12, wherein the first interface module comprises a USB interface.

14. The system of claim 12, wherein the second interface module comprises a JTAG interface.

15. The system of claim 3, wherein the target processor is a multi-core processor with each core comprising a separate execution unit.

16. The system of claim 3, wherein the target processor is a multi-threaded processor comprising at least one execution unit arranged to execute a plurality of interleaved threads.

17. The system of claim 1, wherein the code-testing applet software is programmed to load the code onto the target device and control it to perform the test operation all in response to a single user interaction.

18. The system of claim 17, wherein the single user interaction is a single mouse click.

19. The system of claim 1, wherein the development tool as hosted by the server comprises a plurality of code-analysis applets, and the one or more web pages are configured to display controls allowing a user to select between said applets.

20. A method of testing code using an external test platform connected to a computer terminal, the test platform comprising interface circuitry and a programmable target device, and the method comprising:
downloading a development tool from a server via a network to a web browser installed on the computer terminal, the development tool comprising: one or more web pages, and one or more applets at least comprising code-analysis applet software for testing code on said programmable target device;
providing a user-interface for the development tool by using the web browser to display said one or more web-pages;
accessing the one or more applets via said one or more web pages as displayed by the browser; and
using the web browser to run the code-analysis applet software and thus operate the interface circuitry of said external test platform to load code to be tested from the computer terminal onto said target device for test operation, and to control the target device to perform the test operation using said code.

21. The method of claim 20, wherein the running of the code-analysis applet software by the web browser comprises thus operating said interface circuitry to return to the computer terminal trace information generated by the target device as a result of said test operation.

22. The method of claim 21, wherein the programmable target device comprises a target processor, and the running of the code-analysis applet software by the browser comprises thus operating the interface circuitry to: load executable machine-code to be tested from the computer terminal onto the target processor for test execution, control the target processor to perform the test execution using said machine-code, and return to the computer terminal trace information generated by the target device as a result of said test execution.

23. The method of claim 21, wherein the programmable target device comprises a field programmable gate array, and the running of the code-analysis applet software by the browser comprises thus operating the interface circuitry to: load configuration-code to be tested from the computer terminal onto the field programmable gate array for the test operation, control the field programmable gate array to perform the test operation using said configuration-code, and return to the computer terminal trace information generated by the field programmable gate array as a result of said test execution.

24. The method of claim 20, wherein said download of the development tool via said network is performed via the Internet.

25. The method of claim 21, wherein said return of the trace information comprises returning the trace information to the code-analysis applet software for analysis thereby.

26. The method of claim 25, wherein said analysis by the code-analysis applet software comprises performing one or more debugging functions using said trace information to facilitate the detection of errors in said code.

27. The method of claim 25, wherein said analysis by the code-analysis applet software comprises profiling the test operation using said trace information to determine performance statistics.

28. The method of claim 20, wherein at least the one or more applets comprising the code-analysis applet software as hosted by said server are digitally signed by a private key of a distributor of those one or more applets; and the method comprises: using the web browser to authenticate said one or more applets using a public key distributed by said distributor and corresponding to said private key, and allowing the code-analysis applet software to access the test platform on condition of said authorization.

29. The method of claim 22, wherein said download of the development tool comprises downloading an integrated development environment wherein said one or more applets further comprise at least user-interface applet software and compiler applet software, and the method comprises:
 running the user-interface applet software on said browser in order to provide a user-interface allowing the user to enter high-level source code into the browser; and
 running the compiler applet software on said browser to compile said high-level code into said machine code to be tested.

30. The method of claim 22, wherein the method comprises uploading high-level source code to said server for compilation; and at the server, in response to said upload, compiling said high-level code into said machine code and returning the machine code to the terminal for testing by said code-analysis applet software.

31. The method of claim 20, wherein said operation of the interface circuitry comprises:
 operating a first interface module of the interface circuitry to communicate with the first terminal according to a first protocol, and
 operating a second interface module to convert between the first protocol and a second protocol to communicate with the target device.

32. The method of claim 31, wherein the first interface module comprises a USB interface.

33. The method of claim 31, wherein the second interface module comprises a JTAG interface.

34. The method of claim 22, wherein the target processor is a multi-core processor with each core comprising a separate execution unit.

35. The method of claim 22, wherein the target processor is a multi-threaded processor comprising at least one execution unit arranged to execute a plurality of interleaved threads.

36. The method of claim 20, comprising loading the code onto the target device and controlling it to perform the test operation all in response to a single user interaction.

37. The method of claim 36, wherein the single user interaction is a single mouse click.

38. The method of claim 20, wherein said download of the development tool comprises downloading a plurality of code-analysis applets, and the method comprises using the displayed web pages to select between said applets.

39. A development-tool product for hosting on a server, the development tool comprising:
 one or more applets runnable by a web browser of a client terminal, the one or more applets at least comprising code-analysis applet software for testing code using an external test platform comprising a programmable target device and interface circuitry connected to said client terminal, wherein the code-analysis applet software is programmed so as when run by the web browser to operate the interface circuitry of the external test platform to load code to be tested from the client terminal onto said target device for test operation, and to operate said interface circuitry to control the target device to perform the test operation using said code; and
 one or more web pages for display by the web browser, arranged so as when displayed by the browser to provide a user-interface for the development tool including to provide access to said one or more applets.

40. A server hosting a development tool, the development tool comprising:
 one or more applets runnable by a web browser of a client terminal, the one or more applets at least comprising code-analysis applet software for testing code using an external test platform comprising a programmable target device and interface circuitry connected to the client terminal, wherein the code-analysis applet software is programmed so as when run by the web browser to operate the interface circuitry of the external test platform to load code to be tested from the client terminal onto the target device for test operation, and to operate said interface circuitry to control the target device to perform the test operation using said code; and
 one or more web pages for display by the web browser, arranged so as when displayed by the browser to provide a user-interface for the development tool including to provide access to said one or more applets.

* * * * *